United States Patent
Baek

(10) Patent No.: US 6,837,914 B2
(45) Date of Patent: Jan. 4, 2005

(54) OIL SEPARATING APPARATUS FOR BLOW-BY GAS

(75) Inventor: Hong-Kil Baek, Seoul (KR)

(73) Assignee: Hyundai Motor Company, Seoul (KR)

(*) Notice: Subject to any disclaimer, the term of this patent is extended or adjusted under 35 U.S.C. 154(b) by 111 days.

(21) Appl. No.: 10/269,542

(22) Filed: Oct. 11, 2002

(65) Prior Publication Data

US 2003/0070982 A1 Apr. 17, 2003

(30) Foreign Application Priority Data

Oct. 12, 2001 (KR) .......................................... 2001-62969

(51) Int. Cl.[7] .......................... B01D 45/12; F01M 13/04
(52) U.S. Cl. ...................... 55/459.1; 123/572; 123/573; 123/574; 210/512.1
(58) Field of Search .............................. 210/512.1, 788; 123/572, 573, 574; 55/459.1

(56) References Cited

U.S. PATENT DOCUMENTS 6,591,820 B2 * 7/2003 Kitano et al. ................ 123/573
2001/0005986 A1 * 7/2001 Matsubara et al. ......... 55/459.1

* cited by examiner

Primary Examiner—David A. Reifsnyder
(74) Attorney, Agent, or Firm—Morgan Lewis & Bockius LLP

(57) ABSTRACT

An oil separating apparatus for blow-by gas adapted to form a funnel shaped space in a cylinder head cover to prompt oil contained in the gas to be introduced to an oil line along an inner circumference of the space by way of centrifugal force, thereby inducing the blow-by gas, free of oil, towards a positive crankcase ventilation (PCV) valve.

7 Claims, 2 Drawing Sheets

OIL SEPARATING APPARATUS FOR BLOW-BY GAS

FIELD OF THE INVENTION

The present invention relates to an oil separating apparatus for blow-by gas, and, more particularly, to an apparatus in which oil is separated from the blow-by gas in a funnel shaped space by way of centrifugal force.

BACKGROUND OF THE INVENTION

Generally, a certain amount of exhaust gas or fuel-air mixture leaks into the crankcase from the combustion chamber while an engine is running. As a result, engine oil is affected by heat, moisture in the combustion gas, fuel and the like to be thinned or degenerated, thereby leaving sludge therein. In order to prevent this phenomenon, a ventilation device called breather has been installed in the crankcase to discharge the gas to the atmosphere. In the gas, a large amount of hydrocarbons (HC) are included, such that a positive crankcase ventilation (PCV) valve is provided to induce the gas again into the combustion chamber for further combustion thereof.

To deal with oil in blow-by gas, a conventional cylinder head cover generally includes an inner bottom surface with a plurality of ribs in a complex labyrinthine fashion. When dense and thick blow-by gas passes the ribs, relatively heavy oil is separated and the blow-by gas separated from the oil flows towards the PCV valve. The oil is directed to an oil pan along an oil line, while the blow-by gas, having passed the PCV valve, is introduced to the combustion chamber for re-burning.

However, there is a problem in such devices in that a multitude of labyrinths are formed at an inner bottom side of the cylinder head cover. Although relatively large oil droplets can be separated due to their weight, oil mist of minute particles are still mixed with the blow-by gas to be re-induced into and burnt in the combustion chamber. Such mist in the blow-by gas has disadvantageous effects on oil consumption and emission sides.

SUMMARY OF THE INVENTION

The present invention provides an oil separating apparatus for blow-by gas adapted to form a funnel at a cylinder head cover to prompt oil contained in blow-by gas to be introduced to an oil line along an inner circumference of the funnel by way of centrifugal force, thereby directing the oil free blow-by gas towards the positive crankcase ventilation (PCV) valve.

In one embodiment of the present invention, a chamber is formed at both bottom surfaces of a cylinder head cover so that blow-by gas rising from the crankcase can be collected. An oil separator is formed at one side of the bottom surface in a wide-top, narrow-bottom shaped funnel space. A top side thereof is connected to a PCV valve and a lower side thereof is connected to an oil line. A connecting passage connecting the chamber and the oil separator is formed in far less sectional area than that of the chamber to allow the blow-by gas infused into the chamber to be induced into the oil separator in strong flowing movement.

BRIEF DESCRIPTION OF THE DRAWINGS

For fuller understanding of the nature and objects of the invention, reference should be made to the following detailed description taken in conjunction with the accompanying drawings, in which.

DETAILED DESCRIPTION OF THE INVENTION

Now, construction and operation according to an embodiment of the present invention will be described in detail with reference to the accompanying drawings.

Figure 1:
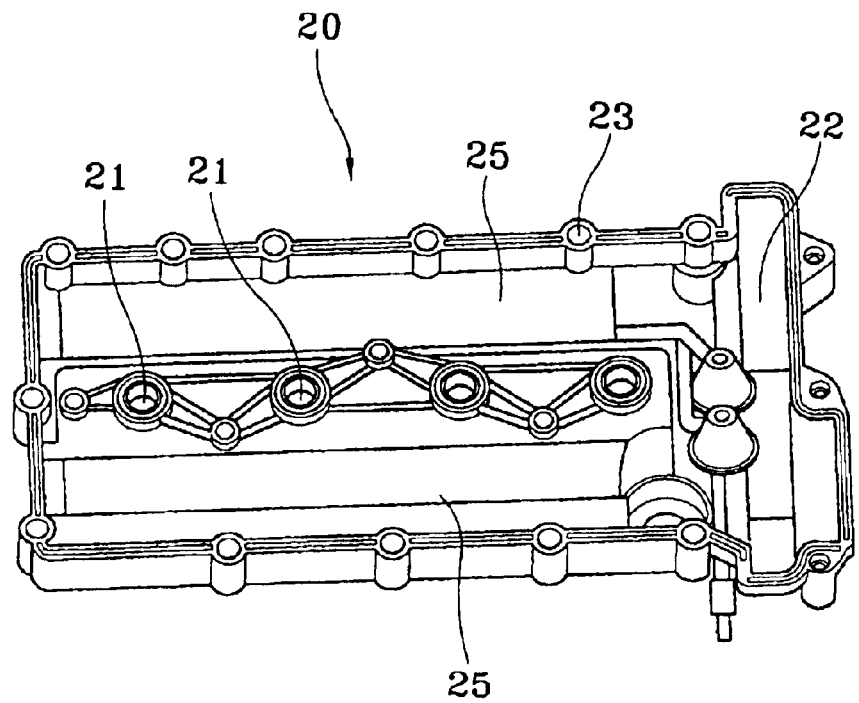
FIG. 1 is a perspective view illustrating a bottom surface of a cylinder head cover formed in accordance with an embodiment of the present invention.
Figure 2:
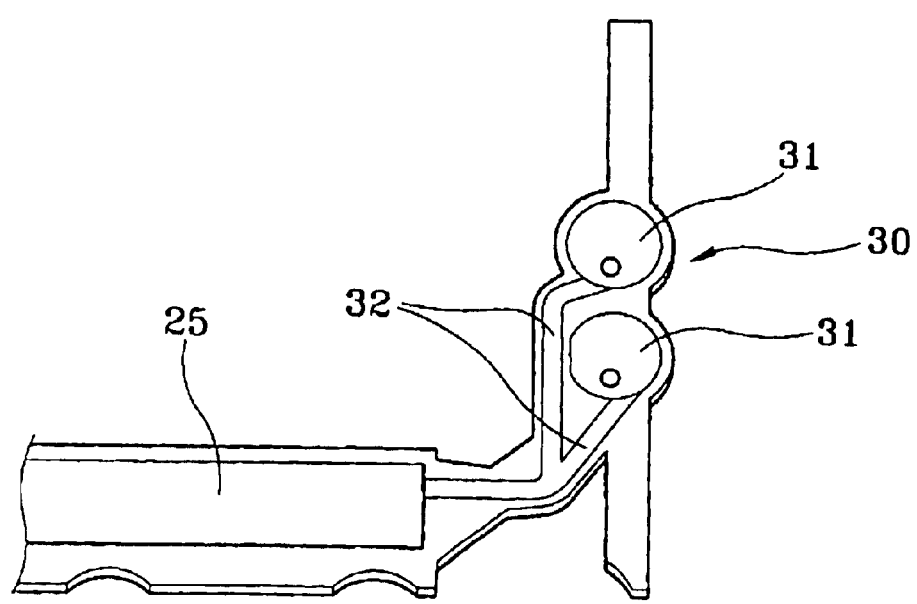
FIG. 2 is a perspective view illustrating a lower cover of the cylinder head cover formed in accordance with an embodiment of the present invention.
Figure 3:
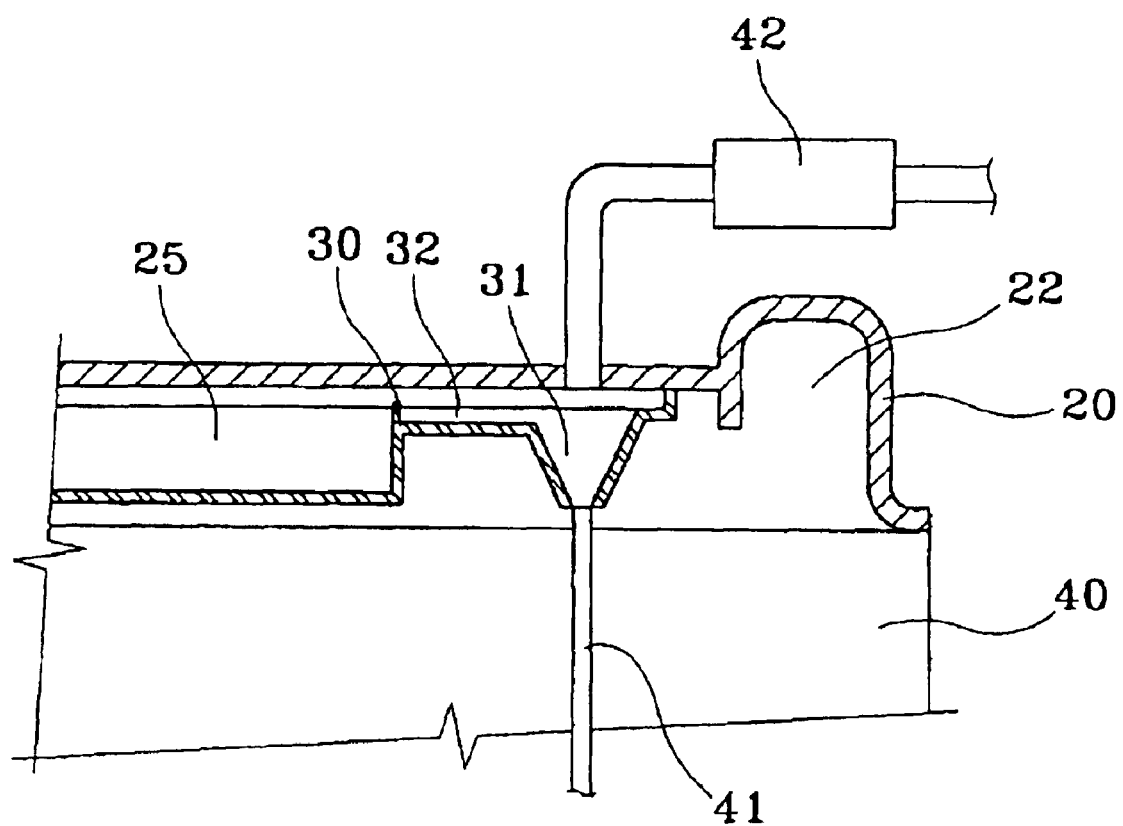
FIG. 3 is a schematic drawing of a blow-by gas oil separator formed in accordance with an embodiment of the present invention.

In FIGS. 1–3, reference numeral 20 indicates a cylinder head cover while reference numeral 40 represents a cylinder head. The cylinder head cover 20 is formed with through holes 21 for accommodating spark plugs mounted as in the prior art and is formed at one side thereof with a mounting space 22 for covering a timing gear part where timing belts or chains are mounted. The cylinder head cover 20 is formed at a periphery thereof with bolt holes 23 for mounting to the cylinder head.

The cylinder head cover 20 is formed at an inner bottom side thereof with a chamber 25 extending lengthwise on both sides to collect the blow-by gas rising from the crankcase. The mounting space 22 is formed therein with wide-topped, narrow-bottomed and funnel-shaped oil separators 31. The cylinder head cover 20 where the oil separators 31 are placed is pierced to be connected to the PCV valve 42 (FIG. 3), while the oil separators 31 are connected thereunder to oil lines 41 formed in the cylinder head 40.

It is preferred that the oil separator 31 is protrusively formed from a separately formed lower cover 30. It is further preferred that the lower cover 30 is formed in synthetic resin to be installed on the cylinder head cover 20.

The lower cover 30 is formed with a connecting passage 32 for connecting the oil separator 31 and the chamber 25. The connecting passage 32 is formed with a much smaller cross-sectional area than that of the chamber 25 to thereby prompt the blow-by gas to move into the oil separator 31 at a fast current speed.

Now, operations of the oil separating apparatus for blow-by gas thus formed will be described.

When an engine is operated, combustion gas or unburned gas generated from the combustion chamber is introduced into the crankcase through a gap between a cylinder wall and a piston ring. The blow-by gas induced into the crankcase rises towards the cylinder head cover to be collected in chamber 25 of the cylinder head cover 20.

The blow-by gas collected in chamber 25 flows into the funnel-shaped oil separator 31 through the connecting passage 32. The blow-by gas has strong flow properties due to fast current speed while passing through from the wider chamber 25 to the narrow connecting passage. As a result, the blow-by gas infused into the oil separator 31 is swirled around an inner circumference of the oil separator 31 by centrifugal force generated from the high speed flow. The heavy oil mist comes down along the inner circumference of the oil separator 31. The oil mist descended along the inner circumference of the oil separator 1 flows to the oil pan through the oil passage 41 mounted at the cylinder head 40.

The blow-by gas thus separated from oil is introduced towards the PCV valve 42 externally formed at the cylinder head cover 20 to be re-supplied to the combustion chamber for re-burning. As a result, there is an advantage in that the oil is separated while being whirled in the funnel-shaped oil separator by the centrifugal force to thereby separate even oil mist having relatively small particles.

As apparent from the foregoing, there is an advantage in the oil separating apparatus for blow-by gas thus described according to an embodiment of the present invention in that the blow-by gas raised from the crankcase side is separated from the heavy oil while being whirled in the inner circumference of the oil separator by centrifugal force to allow even oil mist having relatively smaller particles to be separated, thereby resulting in less oil consumption and less exhaust gas emission.

What is claimed is:

1. An oil separating apparatus for blow-by gas, comprising:
   a chamber formed with a cross-sectional area along a bottom surface of a cylinder head cover to collect blow-by gas rising from a crankcase;
   an oil separator formed in one side of the bottom surface, said oil separator comprising a space with a wide-top, narrow-bottom funnel shape, a top side thereof being connected to a PCV valve and a lower side thereof being connected to an oil line; and
   a connecting passage connecting the chamber and the oil separator, said passage having a cross-sectional area less than that of the chamber to allow the blow-by gas infused into the chamber to be induced into the oil separator at a high flow rate to form a swirling motion in said oil separator sufficient to remove oil by centrifugal force.

2. The apparatus as defined in claim 1, wherein the oil separator is formed in a lower cover separately formed from the cylinder head cover and mounted on the cylinder head cover.

3. An apparatus for separating oil from blow-by as in an internal combustion engine including a crankcase cylinder head cover and PCV valve, said cylinder head cover defining a chamber for collecting blow-by gas from the crankcase, the apparatus comprising:
   a portion of the cylinder head cover defining a funnel shaped space wherein a wide top side communicates with the PCV valve and a narrow lower side communicates with an oil line; and
   a connecting passage formed between the collecting chamber and funnel shaped space, wherein said connecting passage is narrower than the chamber thereby imparting an increased speed to blow-by gas passing therethrough.

4. The apparatus of claim 3, wherein the funnel shaped space, connecting passage and chamber are configured and dimensioned in combination to impart a swirling flow to blow-by gas in the funnel shaped space sufficient to separate oil in the blow-by gas by centrifugal force.

5. The apparatus of claim 3, wherein said portion is formed as a separate part mounted on the cylinder head cover.

6. The apparatus of claim 5, wherein said portion is made of resin.

7. An oil separating apparatus for blow-by gas, comprising:
   a cylinder head cover defining a chamber at a bottom region thereof, said chamber configured and dimensioned to collect blow-by gas rising from a crankcase;
   an oil separator formed in one side of the bottom region of the chamber, said oil separator comprising a space with a wide-top and narrow-bottom funnel shape, wherein a top side thereof being connected to a PCV valve and a lower side thereof being connected to an oil line; and
   a connecting passage formed between the collecting chamber and funnel shaped space.

\* \* \* \* \*